United States Patent [19]

Sivaram et al.

[11] Patent Number: 5,710,238
[45] Date of Patent: Jan. 20, 1998

[54] PROCESS FOR PREPARING BRANCHED POLYCARBONATES BY SOLID STATE POLYMERIZATION

[75] Inventors: Swaminathan Sivaram; Sukhendu Bikash Hait, both of Maharashtra, India

[73] Assignee: General Electric Company, Schenectady, N.Y.

[21] Appl. No.: 653,166

[22] Filed: May 24, 1996

[30] Foreign Application Priority Data

Dec. 29, 1995 [IN] India ............... 2463/DEL/95

[51] Int. Cl.$^6$ ............................................. C08G 64/00
[52] U.S. Cl. .................... 528/196; 528/196; 528/198; 528/201; 528/202
[58] Field of Search ................. 528/196, 198, 528/201, 202

[56] References Cited

U.S. PATENT DOCUMENTS

| | | | |
|---|---|---|---|
| 4,415,725 | 11/1983 | Hedges et al. | 528/204 |
| 4,948,871 | 8/1990 | Fukuoka et al. | 528/481 |
| 5,204,377 | 4/1993 | Fukawa et al. | 521/60 |
| 5,266,659 | 11/1993 | Sivaram et al. | 525/463 |

*Primary Examiner*—Terressa Mosley
*Attorney, Agent, or Firm*—William H. Pittman

[57] ABSTRACT

This invention involves a novel process for preparing branched polycarbonates employing a solid state polycondensation process; specifically, subjecting a linear crystallized oligomer derived from dihydroxydiaryl compound and a diaryl carbonate to solid state polycondensation process by heating the said oligomer at a temperature which is higher than the glass transition temperature but below its melting point in the presence of a multifunctional phenol and an alkali or alkaline metal salt or bisphenol or tetraalkylammonium hydroxide, carboxylate or bicarboxylate catalyst, the reaction being effected under inert atmosphere.

14 Claims, No Drawings

PROCESS FOR PREPARING BRANCHED POLYCARBONATES BY SOLID STATE POLYMERIZATION

This invention relates to a process for the preparation of a branched poly (acrylcarbonate)s. More particularly the present invention provides a process for the preparation of branched poly (arylcarbonate) s using solid state polycondensation process of a preformed oligomer in presence of a branching agent and catalyst.

Polycarbonate resin suitable for blow molding applications such as the reduction of hollow articles of large volumes and large panels are required to have high melt strength. high shear sensitivity and a complex viscosity ratio. In order to achieve such properties. Polycarbonate with a critical degree of branching are required.

It is known in the prior art that branched polycarbonates. for example. bisphenol-A polycarbonate, which exhibit high melt strength properties. can be prepared either by a) interfacial polycondensation or by b) melt phase carbonate interchange reaction using small amounts of polyhydric phenols as branching agent.

The use of polyhydric phenols having three or more hydroxy group per molecule for example. 1,1,1-tris-(4-hydroxyphenyl) ethane, 1,3,5-tris-(4-hydroxyphenyl) benzene, 1,4-bis-{di-(4-hydroxyphenyl) phenylmethyl} benzene and the like as branching agent for high melt strength blow moldable polycarbonate resins prepared by interfacial polycondensation has been described in U.S. Pat. No. 3,799,953.

Other methods known for the preparation of branched polycarbonates through interfacial polycondensation methods include the use of cyanuric chloride as branching agents (U.S. Pat. No. 3,541,049); branched dihydric phenols as a branching agents (U.S. Pat. No. 4,469,861); and 3, 3-bis-(4-hydroxyphenyl)-oxyindoles as branching agents (U.S. Pat. No. 4,185,009).

The main drawbacks of the above processes are that such interfacial processes involve the use of toxic and hazardous phosgene. In addition. the processes use a chlorinated hydrocarbon as solvent and require disposal of chloride containing solid wastes. In addition the product poly(arylcarbonate) contains residual sodium and chloride ions which adversely affect the hydrolytic stability of the product.

Methods to prepare branched poly(arylcarbonate)s through melt phase carbonate interchange reaction using 1,1,1-tris(4-hydroxyphenyl) ethane (THPE) been described in U.S. Pat. No. 4,888,400 and Eur. Pat No. 400478.

Triphenyl-trimellitate (Eur. Pat. No. 140341) and triglycidyl isocyanurate (U.S. Pat. No. 4,959,422) has also been used as branching agent for the synthesis of branched polycarbonate in melt phase.

Synthesis of branched bisphenol-A polycarbonate with high shear sensitivity from cyclic oligocarbonate has been described by Boden et al (Makromol. Chem., Macromol. Symp. 42/43 (1991), 167–76.) and in U.S. Pat. No. 5,097,008.

Examples of improved branched poly(arylcarbonate)s by incorporation of 3.3-bis-(4-hydroxyphenyl)-oxyindoles as branching agent has been described in U.S. Pat. No. 4,185,009.

Linear high molecular weight polycarbonates can be polycondensed in the melt phase with THPE resulting in the production of branched polycarbonates suitable for blow molding applications (U.S. Pat. No. 5,021,521). However, this process requires high temperatures (270°–300° C.) and special equipments.

However, all the prior art processes for the preparation of branched polycarbonates use a melt phase process. The melt phase process suffers from the disadvantage that at very high conversions (>98%), the melt viscosity increases considerably. Handling of high viscosity melts at high temperature is difficult. There is an increased chance of poor mixing and generation of hot spots leading to loss of product quality. In addition, this route requires specially designed equipments such as Helicone mixer operating at temperatures in the range of 270°–300° C.

An alternative process for the preparation of high molecular weight polycarbonates involves the use of a polycondensation processes occuring in the solid state, at substantially lower temperatures, in the range of 180°–230° C. This process does not require handling melt at high temperatures and the equipments needed to perform the reaction is very simple.

Solid state polycondensation process has been described in the prior art. (U.S. Pat. No. 5,266,659: U.S. Pat. No. 4,948,871; PCT Pat. No. 90/07536)

In these processes, a suitable oligomer is subjected to programmed heating above the glass transition temperature of the polymer but below the sticking temperature of the polymer with removal of the volatile by-product. The polycondensation reaction proceeds strictly in the solid state under these conditions.

In the prior art no process is known to prepare branched polycarbonate employing a solid state polycondensation process.

It is thus an objective of the present invention to provide a process for the preparation of a branched poly (arylcarbonate) by solid state polycondensation of a suitable oligomer.

Another objective of the present invention is to provide a process for the preparation of branched poly (arylcarbonate)s by solid state polycondensation of a suitable oligomer employing multifunctional phenols.

The main objective of the present invention is therefore to provide a process for producing branched polycarbonate via solid state polycondensation.

The process of the present invention is, preferable, conducted in two stages. In the first stage, a low melt viscosity linear oligomer is synthesized by the melt phase reaction of a bisphenol with diaryl carbonate. The oligomer thus formed is subjected to solid state polycondensation in presence of polyhydroxy compound preferably in the range of 0.1 to 2 wt %.

Accordingly, the present invention provides a process for the preparation of branched poly (arylcarbonate)s which comprises subjecting a linear crystallised oligomer derived from dihydroxydiaryl compound and a diaryl carbonate to solid state polycondensation process by heating the said oligomer at a temperature which is higher than the glass transition temperature but below its melting point in the presence of a multifunctional phenol and an alkali or alkaline metal salt of bisphenol or tetraalkylammonium hydroxide, carboxylate or bicarboxylate catalyst, the reaction being effected under inert atmosphere.

In a preferred embodiment of the invention there is provided a process for the preparation of branched polycarbonate which comprises heating a mixture of a dihydroxydiaryl compound and a diaryl carbonate at 150° to 325° C. and for 4 to 10 hours in presence of a transesterification catalyst to prepare an oligomer having weight average molecular weight of 2,000–20,000 and having both hydroxyl and carbonate end groups, crystallizing the oligomer either by controlled method and effecting solid state polycondensation of the crystallized oligomer in presence of a polyhydric phenols as a branching agent.

The synthesis of the linear oligomer is conducted in the molten state in the temperature range of 150°–325° C. the desirable range being 180°–300° C. The pressure is in the range of 760 to 0.1 mm of Hg or less during the process and diaryl carbonate is removed from the reaction mixture. Such processes for linear oligomer synthesis are widely known in the prior art (U.S. Pat. No. 5,371,170; U.S. Pat. No. 5,319,066; U.S. Pat. No. 5,276,109; U.S. Pat. No. 5,288,838; U.S. Pat. No. 5,142,018.

The crystallization of the linear poly(arylcarbonate) oligomer may be effected either by (a) dissolving the oligomer in a solvent and evaporating the solvent in presence of a suitable catalyst or (b) suspending the oligomer in diluent and refluxing it for 0 to 10 hrs in presence of a suitable catalyst followed by evaporating the diluent or (c) heating the oligomer at a temperature which is higher than the glass transition temperature but below its melting point in the presence of a suitable catalyst. The oligomer prepared has crystallinity between 5 to 55% as measured by differential scanning calorimeter.

Among the aromatic bishydroxy compounds which may be suitable for the present invention are the following compounds:

Bis(hydroxyphenyl)alkanes such as bis(4-hydroxyphenyl) methane, 1,1-bis(4-hydroxyphenyl) ethane, 2,2-bis(4-hydroxyphenyl) propane, 2,2-bis (4-hydroxyphenyl) butane, 2,2-bis hydroxyphenyl) octane, bis(4-hydroxyphenyl)-phenyl methane, 2,2-bis(4-hydroxy-1-methylphenyl) propane, 2,2-bis (4-hydroxy-t-butylphenyl) propane, and 2,2-bis (4-hydroxy-3-bromophenyl) propane; bis(hydroxyaryl) cycloalkanes such as 1,1-bis(4-hydroxyphenyl) cyclopentane, and 1,1-bis (4-hydroxyphenyl) cyclohexane; dihydroxyaryl ethers such as 4,4-dihydroxyphenylether and 4,4'-dihydroxy-3,3'-dimethyldiphenyl ether; dihydroxydiaryl sulfoxides such as 4, 4'-dihydroxydiphenyl sulfoxide and 4,4'-dihydroxy-3,3'-dimethyldiphenyl sulfoxide and dihydroxydiaryl sulfones such as 4,4'-dihydroxydiphenyl sulfone and 4,4'-dihydroxy-3,3'-dimethyldiphenyl sulfone.

Of the compounds as exemplified above, particularly preferred is 2,2-bis(4-hydroxyphenyl) propane is particularly preferred. The diaryl carbonate used is a carbonate ester of an aromatic monohydroxy compound. Among the diaryl carbonate which may be suitable for the present invention are the following compounds:

Diphenyl carbonate, ditolyl carbonate, bis(chlorophenyl) carbonate, m-cresyl carbonate, dinaphthyl carbonate, bis (diphenyl) carbonate etc. Of these diphenyl carbonate is particularly preferred.

The ratio of the diaryl carbonate to the dihydroxydiaryl compound varies depending upon the type of the diaryl carbonate and dihydroxydiaryl compound employed. However, in general, the diaryl carbonate is used in an amount of 0.95–2.0 moles, more preferably, from 1.01–1.50 moles per mole of dihydroxydiaryl compound.

The hydroxyl number of the oligomer suitable for use in the process is between 3–20, the preferred value being 5–18.

The method of crystallization of the oligomer is not particularly limited. However, it is preferred that the crystallization is affected by either using a solvent or diluent or by thermal treatment. Solvents which are suitable for crystallization are aliphatic halogenated hydrocarbon such as chloroform, dichloromethane, chloroethane, dichloroethane (position isomer); ethers such as tetrahydrofuran and dioxane, diluents which are suitable for crystallization are esters such as methyl acetate and ethyl acetate; ketones such as acetone and methyl ethyl ketone and aromatic hydrocarbons such as benzene, toluene and xylene.

The solvents/diluents are used individually or in combination. The amount of solvent used varies depending upon the type of the oligomer, type of solvent/diluent and the desired crystallinity. However, the solvent is generally used in an amount of 1–100 times, preferable 2–50 times by weight of the oligomer.

In thermal crystallization method, the oligomer is subjected to programmed heating at a temperature which is higher than the glass transition temperature but lower than the melting point of the oligomer. The temperature generally ranges from 140°–190° C. and more preferably 150°–180° C.

The catalyst used may be any of the common catalyst used in transesterification reaction, examples are, alkali or alkaline metal salt of bisphenol such as disodium salt of bisphenol-A; dipotassium salt of bisphenol-A; tetraalkylammonium hydroxide such as tetrabutylammonium hydroxide; tetramethylammonium hydroxide; tetraalkylammonium carboxylates such as tetrabutylammonium hydrogenbisbenzoate; tetrabutylammonium hydrogen bis-o-nitrobenzoate; tetrabutylammonium hydrogen-bis-p-nitrobenzoate; tetrabutylammonium hydrogen bis-N,N-dimethylammonium benzoate, tetrabutylammonium hydrogen bis-p-methoxybenzoate and tetramethylammonium hydrogen maleate.

Polyhydric phenols suitable as branching agents in the present invention include any triol or tetrol or higher substituted polyhydric phenol, for example, 1, 1, 1-tris-(4-hydroxyphenyl) ethane; 1,3,5-tris-(2-hydroxyethyl) cyanuric acid: 4,6-dimethyl-2,4,6-tris-(4-hydroxyphenyl) heptane-2; 2,2-bis-4,4'-(4,4''dihydroxyphenyl)-cyclohexyl propane; 1,3,5-trihydroxybenzene: 1,2,3-trihydroxybenzene and 1,4-bis-(4',4''-dihydroxytriphenylmethyl) benzene. Such compounds and examples of additional polyhydric phenols suitable for use herein and their method of preparation are described, for example, in U.S. Pat. No. 3,799,953.

Other commercially available polyhydric phenols useful herein include, for example, 2',3',4'-trihydroxyacetophenone; 2,3,4-trihydroxybenzoioc acid; 2,3,4-trihydroxybenzophenone; 2,4,4'-trihydroxybenzophenone; 2',4',6'-trihydroxy-3-(4-hydroxyphenyl) propiophenone; pentahydroxyflavone; 3,4,5-trihydroxypyrimidine; 3,4,5-trihydroxyphenylmethyl amine; tetrahydroxy-1,4-quinone hydrate: 2,2',4,4' tetrahydroxybenzophenone: and 1,2,5,8 tetrahydoxy anthraquinone.

While other polyhydroxy phenols suitable for the practice of the present invention will occur to those well versed in the art, 1,1,1-tris(4-hydroxyphenyl)ethane (THPE) is preferred as the compound is readily available at a low price.

Solid state polycondensation may be carried out by heating the crystallized oligomer along with the branching agent and a suitable catalyst. The reaction temperature and time may vary according to the type (chemical structure, molecular weight etc) of crystallized oligomer. However, it should be at least above the glass transition temperature and below the melting or sticking point of the oligomer. At this temperature the oligomer should not fuse during the solid state polycondensation. Since the melting point of the crystallized oligomer increases during the course of polycondensation, therefore it is desirable to increase the polycondensation temperature gradually. Generally the temperature should be 10°–50° C. below the melting point of the oligomer and it should be in the range of 150°–250° C. and more preferably between 180°–220° C. The reaction temperature should not exceed 220° C. Otherwise excessive gelation will occur.

During the process of solid state polycondensation, the by-product should be removed from the reaction system so as to allow the reaction to progress. For this an inert gas is passed through the system which carries the by-product out of the system. The inert gases which are generally used are $N_2$, He, $Co_2$, Ar etc and the flow rate of the carrier gas varies from 0.1 to 4 L/min. depending upon the type of reactor and the particle size of the oligomer. The rate of polycondensation is very much dependent on the type and the flow rate of the carrier gas.

After polycondensation the amount of branching agent incorporated in the polymer can be determined by degradative hydrolysis of the polymer and by HPLC analysis of the product using an internal standard. Any unreacted branching agent is removed by repeated dissolution and precipitation prior to analysis.

The poly(arylcarbonate) produced by the process of this invention is tested for following test by method described below.

1. Inherent viscosity was measured at 30° C. using an ubbleohde viscometer in chloroform.
2. The hydroxyl number was estimated by UV-Visible spectrometry using the method given in Macromolecules, 26, 1186 (1993).
3. The weight % of branching agent incorporated was analyzed by HPLC after degradative hydrolysis of the polymer using a ZORBAX $SBC_8$ RP column and acetonitrile/$H_2O$ solvent using 30% acetonitrile and 70% water followed by 100% acetonitrile and 0% water to 20% acetonitrile and 80% water in a total time of 45 minutes. The detector used is a UV multiwavelength detector (waters 490 E) which is set at 280 nm and changed it to 264 nm after an elapsed time of 17 minutes.

The invention is described in detail in the Examples given below which are provided by way of illustration only and should not however be construed to limit the scope of the invention.

EXAMPLE 1

Bisphenol-A (200 g. 0.877 mole), diphenyl carbonate (197.1 g, 0.921 mole) and tetrabutylammonium hydrogen-bis-o-nitro-benzoate ($1.0317 \times 10^{-5}$ mole) were charged into a 2 L stainless steel autoclave reactor under $N_2$ atmosphere. The reaction temperature was increased from room temperature to 230° C. in a period of 20 minutes. At this temperature the reaction was continued for 90 minutes under $N_2$. Thereafter the reaction temperature was gradually increased to 300° C. by reducing the pressure from 760 to 1 mm of Hg within a period of 3 hours. Finally the reaction was carried out at 300° C. for 30 minutes under 1 mm of Hg pressure. The resulting polymer was cooled to room temperature, dissolved in chloroform precipitated with methanol and dried in vacuo. The yield of the polymer was 200 g with an inherent viscosity of 0.17 dL/g in chloroform at 30° C. The polymer had a hydroxyl number of 11.

In a 100 mL round bottom flask about 10 g of the oligomer was dissolved in 50 mL chloroform to which methanolic solution of tetramethylammonium hydrogen maleate (25 ppm) and 0–5 weight % of THPE was added and the mixture stirred for 1 hour. Chloroform was evaporated and the polymer was dried under vacuum at 60° C. for 4 hours. The oligomer was then pulverized and particles passing through standard sieves (35–60 mesh) were used for solid state polycondensation. The solid state polycondensation reaction was performed using a fluidized bed reactor. The reaction was carried out using 3 g of oligomer which was initially conditioned by gradually heating from room temperature to 180° C. over a period of 1 hour and retaining the sample at 180° C. for 1 hour while a stream of carrier gas was maintained through out the reaction. Further, reaction was carried out at 220° C. for 4 hours under the same condition. The polymer (1 g) obtained as above was dissolved in chloroform and precipitated from methanol to remove the unreacted THPE. The inherent viscosity of the polymer obtained is 0.29 dL/g in chloroform at 30° C. About 0.1 g of the polymer was hydrolyzed with 5 mL 18 weight % aqueous KOH solution. The product obtained was analyzed by HPLC technique using N,N-dimethylaminonaphthalene as an internal standard. The analysis showed that 0.49 weight % THPE was incorporated in the poly (arylcarbonate).

EXAMPLE 2

Bisphenol-A (200 g, 0.877 mole), diphenyl carbonate (197.1 g, 0.921 mole) and tetrabutylammonium hydrogen-bis-o-nitro-benzoate ($1.0317 \times 10^{-5}$ mole) were charged into a 2 L stainless steel autoclave reactor under $N_2$ atmosphere. The reaction temperature was increased from room temperature to 230° C. in a period of 20 minutes. At this temperature the reaction was continued for 90 minutes under $N_2$. Thereafter the reaction temperature was gradually increased to 300° C. by reducing the pressure from 760 to 1 mm of Hg within a period of 3 hours. Finally the reaction was carried out at 300° for 30 minutes under 1 mm of Hg pressure. The resulting polymer was cooled to room temperature, dissolved in chloroform, precipitated with methanol and dried in vacuo. The yield of the polymer was 200 g with an inherent viscosity of 0.17 dL/g in chloroform at 30° C. The polymer had a hydroxyl number of 11.

In a 100 mL round bottom flask about 10 g of the oligomer was dissolved in 50 mL chloroform to which methanolic solution of tetramethylammonium hydrogen maleate (25 ppm) and 0.75 weight % of THPE was added and the mixture stirred of 1 hour. Chloroform was evaporated and the polymer was dried under vacuum at 60° C. for 4 hours. The oligomer was then pulverized and particles passing through standard sieves (35–60 mesh) were used for solid state polycondensation. The solid state poly condensation reaction was performed using a fluidized bed reactor. The reaction was carried out using 3 g of oligomer which was initially conditioned by gradually heating from room temperature to 180° C. over a period of 1 hour and retaining the sample at 180° C. for 1 hour while a stream of carrier gas was maintained through out the reaction. Further, reaction was carried out at 220° C. for 4 hours under the same condition. The polymer (1 g) obtained as above was dissolved in chloroform and precipitated from methanol to remove the unreacted 1,1,1-tris (4-hydroxyphenyl) ethane (THPE). The inherent viscosity of the polymer obtained is 0.28 dL/g in chloroform at 30° C. About 0.1 g of the ploymer was hydrolyzed with 5 mL 18 weight % aqueous KOH solution. The Poly(arylcarbonate) obtained was analyzed by HPLC technique using N,N-dimethylaminonaphthalene as an internal standard. The analysis showed that 0.7 weight % THPE was incorporated in the poly(arylcarbonate).

EXAMPLE 3

Bisphenol-A (200 g, 0.877 mole), diphenyl carbonate (197.1 g, 0.921 mole) and tetrabutylammonium hydrogen-bis-o-nitro-benzoate ($1.0317 \times 10^{-5}$ mole) were charged into a 2 L stainless steel autoclave reactor under $N_2$ atmosphere. The reaction temperature was increased from room temperature to 230° C. in a period of 20 minutes. At this temperature the reaction was continued for 90 minutes under $N_2$. Thereafter the reaction temperature was gradually increased to 300° C. by reducing the pressure from 760 to 1 mm of Hg within a period of 3 hours. Finally the reaction was carried out at 300° C. for 30 minutes under 1 mm of Hg pressure. The resulting polymer was cooled to room temperature, dissolved in chloroform precipitated with methanol and dried in vacuo. The yield of the polymer was 200 g with an inherent viscosity of 0.17 dL/g in chloroform at 30° C. The polymer had a hydroxyl number of 11.

In a 100 mL round bottom flask about 10 g of the oligomer was dissolved in 50 mL chloroform to which methanolic solution of tetramethylammonium hydrogen maleate (25 ppm) and 1.0 weight % of THPE was added and the mixture stirred for 1 hour. Chloroform was evaporated and the polymer was dried under vacuum at 60° C. for 4 hours. The oligomer was then pulverized and particles passing through standard sieves (35–60 mesh) were used for solid state polycondensation. The solid state polycondensation reaction was performed using a fluidized bed reactor. The reaction was carried out using 3 g of oligomer which was initially conditioned by gradually heating from room temperature to 180° C. over a period of 1 hour and retaining the sample at 180° C. for 1 hour while a stream of carrier gas was maintained through out the reaction. Further, reaction was carried out at 220° C. for 4 hours under the same condition. The polymer (1 g) obtained as above was dissolved in chloroform and precipitated from methanol to remove the unreacted THPE. The inherent viscosity of the polymer otained is 0.27 dL/g in chloroform at 30° C. About 0.1 g of the polymer was hydrolyzed with 5 mL 18 weight % aqueous KOH solution. The poly(arylcarbonate) obtained was analyzed by HPLC technique using N,N-dimethylaminonaphthalene as an internal standard. The analysis showed that 0.96 weight % THPE was incorporated in the poly(arylcarbonate).

EXAMPLE 4

Bisphenol-A (200 g, 0.877 mole), diphenyl carbonate (197.1 g, 0.921 mole) and tetrabutylammonium hydrogen-bis-o-nitro-benzoate ($1.0317 \times 10^{-5}$ mole) were charged into a 2 L stainless steel autoclave reactor under $N_2$ atmosphere. The reaction temperature was increased from room temperature to 230° C. in a period of 20 minutes. At this temperature the reaction was continued for 90 minutes under $N_2$. Thereafter the reaction temperature was gradually increased to 300° C. by reducing the pressure from 760 to 1 mm of Hg within a period of 3 hours. Finally the reaction was carried out at 300° C. for 30 minutes under 1 mm of Hg pressure. The resulting polymer was cooled to room temperature, dissolved in chloroform precipitated with methanol and dried in vacuo. The yield of the ploymer was 200 g with an inherent viscosity of 0.17 dL/g in chloroform at 30° C. The polymer had a hydroxyl number of 11.

In a 100 ml round bottom flask about 10 g of the oligomer was dissolved in 50 mL chloroform to which methanolic solution of tetramethylammonium hydrogen maleate (25 ppm) and 1.5 weight % of THPE was added and the mixture stirred for 1 hour. Chloroform was evaporated and the polymer was dried under vacuum at 60° C. for 4 hours. The oligomer was then pulverized and particles passing through standard sieves (35–60 mesh) were used for solid state polycondensation. The solid state poly condensation reaction was performed using a fluidized bed reactor. The reaction was carried out using 3 g of oligomer which was initially conditioned by gradually heating from room temperature to 180° C. over a period of 1 hour and retaining the sample at 180° C. for 1 hour while a stream of carrier gas was maintained through out the reaction. Further, reaction was carried out at 220° C. for 4 hours under the same condition. The polymer (1 g) obtained as above was dissolved in chloroform and precipitated from methanol to remove the unreacted THPE. The inherent viscosity of the polymer obtained is 0.31 dL/g in chloroform at 30° C. About 0.1 g of the polymer was hydrolyzed with 5 mL 18 weight % aqueous KOH solution. The poly (arylcarbonate) obtained was analyzed by HPLC technique using N,N-dimethylaminonaphthalene as an internal standard. The analysis showed that 1.3 weight % THPE was incorporated in the poly (arylcarbonate). However, 2.5 % gel formation was observed in this case.

EXAMPLE 5

Bisphenol-A (200 g, 0.877 mole), diphenyl carbonate (197.1 g, 0.921 mole) and tetrabutylammonium hydrogen-bis-o-nitrobenzoate ($1.0317 \times 10^{-5}$ mole) were charged into the 2 L stainless steel autoclave under $N_2$ atmosphere. The reaction temperature was increased from room temperature to 230° C. in a period of 20 minutes. At this temperature the reaction was continued for 90 minutes under $N_2$. Thereafter the reaction temperature was gradually increased to 300° C. by reducing the pressure from 760 to 1 mm of Hg within a period of 3 hours. Finally the reaction was carried out at 300° C. for 2 Hours under 1 mm of Hg pressure. The resulting polymer was cooled to room temperature, dissolved in chloroform, precipitated with methanol and dried in vacuo. The yield of the ploymer was 200 g with an inherent viscosity of 0.42 dL/g in chloroform at 30° C. The polymer had a hydroxyl number of 7.

In a 100 mL round bottom flask about 10 g of the oligomer was dissolved in 50 mL chloroform to which methanolic solution of disodium salt of bisphenol-A (25 ppm) and 0.5 weight % THPE was added and the mixture stirred for 1 hour. Chloroform was evaporated and the polymer was dried under vacuum at 60° C. for 4 hours. The oligomer was then pulverized and particles passing through standard sieves (35–60 mesh) were used.

The solid state polycondensation reaction was performed using fluidized bed reactor. The reaction was carried out using 3 g of oligomer which was initially conditioned by gradually heating from room temperature to 180° C. over a period of 1 hour and retaining the sample at 180° C. for 1 hour while a stream of carrier gas (2 L/min) was maintained through out the reaction. Further, reaction was carried out at 210° C. for 4 hours under the same condition. The polymer (1 g) obtained as above was dissolved in chloroform and precipitated from methanol to remove the unreacted THPE. The inherent viscosity of the polymer thus otained is 0.58 dL/g in chloroform at 30° C. About 0.1 g of this polymer was degradative hydrolyzed with 5 mL 18 weight % aqueous KOH solution. The product obtained was analyzed by HPLC using N,N-dimethylaminonaphthalene as an internal standard. HPLC shows 0.39 weight % THPE is incorporated and 1.5 % gel formation.

EXAMPLE 6

Bisphenol-A (200 g, 0.877 mole), diphenyl carbonate (197.1 g, 0.921 mole) and tetrabutylammonium hydrogen-bis-o-nitrobenzoate ($1.0317 \times 10^{-5}$ mole) were charged into the 2 L stainless steel autoclave under $N_2$ atmosphere. The reaction temperature was increased from room temperature to 230° C. in a period of 20 minutes. At this temperature the reaction was continued for 90 minutes under $N_2$. Thereafter the reaction temperature was gradually increased to 300° C. by reducing the pressure from 760 to 1 mm of Hg within a period of 3 hours. Finally the reaction was carried out at 300° C. for 2 hours under 1 mm of Hg pressure. The resulting polymer was cooled to room temperature, dissolved in chloroform, precipitated with methanol and dried in vacuo. The yield of the polymer was 200 g with an inherent viscosity of 0.42 dL/g in chloroform at 30° C. The polymer had a hydroxyl number of 7.

In a 100 mL round bottom flask about 10 g of the oligomer was dissolved in 50 mL chloroform to which methanolic solution of disodium salt of bisphenol-A (25 ppm) and 0.75 weight % THPE was added and the mixture stirred for 1 hour. Chloroform was evaporated and the polymer was dried under vacuum at 60° C. for 4 hours. The oligomer was then pulverized and particles passing through standard sieves (35–60 mesh) were used.

The solid state polycondensation reaction was performed using fluidized bed reactor. The reaction was carried out using 3 g of oligomer which was initially conditioned by gradually heating from room temperature to 180° C. over a period of 1 hour and retaining the sample at 180° C. for 1 hour while a stream of carrier gas (2 L/min) was maintained through out the reaction. Further, reaction was carried out at 210° C. for 4 hours under the same condition. The polymer (1 g) obtained as above was dissolved in chloroform and precipitated from methanol to remove the unreacted THPE. The inherent viscosity of the polymer thus otained is 0.43 dL/g in chloroform at 30° C. About 0.1 g of this polymer was degradative hydrolyzed with 5 mL 18 weight % aqueous KOH solution. The poly(arylcarbonate) obtained was analyzed by HPLC using N,N-dimethylaminonaphthalene as an internal standard. HPLC shows 0.7 weight % THPE is incorporated and 4.5% gel formation.

We claim:

1. A process for the preparation of branched polycarbonates which comprises subjecting a linear crystallised polycarbonate oligomer prepared by reaction of a dihydroxydiaryl compound with a diaryl carbonate to solid state polycondensation by heating said oligomer at a temperature higher than its glass transition temperature but below its melting point, in the presence of a multifunctional phenol and an alkali or alkaline metal salt of a bisphenol or a tetraalkylammonium hydroxide, carboxylate or bicarboxylate as catalyst, said polycondensation being effected in an inert atmosphere.

2. A process as claimed in claim 1 wherein the linear crystallised polycarbonate oligomer employed has an inherent viscosity in the range of 0.15 to 0.40 dL/g as measured in chloroform at 30° C.

3. A process as claimed in claim 1 wherein the linear crystallised polycarbonate oligomer employed has a hydroxyl number from 5 to 18.

4. A process as claimed in claim 1 wherein the linear crystallised polycarbonate oligomer employed has crystallinity from 5 to 55%.

5. A process as claimed in claim 1 wherein the linear crystallised polycarbonate oligomer employed is derived from a bisphenol chosen from bis(4-hydroxyphenyl) methane; 1,1-bis(4-hydroxyphenyl) ethane; 2,2-bis(4-hydroxy phenyl) propane; 2,2-bis(4-hydroxyphenyl) butane; 2,2-bis (4-hydroxyphenyl) octane; bis(4-hydroxyphenyl)-phenylmethane; 2,2-bis(4-hydroxy-1-methylphenyl) propane; 2,2-bis(4-hydroxy-butylphenyl) propane, 2,2 bis(4-hydroxy-3-bromophenyl) propane, 1,1 -bis(4-hydroxyphenyl) cyclopentane, 1,1-bis(4-hydroxy phenyl) cyclohexane, 4,4'-dihydroxyphenyl ether, 4,4'-dihydroxy-3, 3'-dimethyldiphenyl ether, 4,4'-dihydroxydiphenyl sulfoxide, 4,4'-dihydroxy-3,3'-dimethyldiphenyl sulfoxide and 4,4'-dihydroxydiphenyl sulfone.

6. A process as claimed in claim 1, wherein the diaryl carbonate used is diphenyl carbonate, ditolyl carbonate, bis(chlorophenyl) carbonate, m-cresyl carbonate, dinaphthyl carbonate or bis(diphenyl) carbonate.

7. A process as claimed in claim 1, wherein the oligomer is subjected to solid state polycondensation in presence of 0.1 to 2 wt % of a multifunctional phenol.

8. A process as claimed in claim 1, wherein the multifunctional phenol used is chosen from 1,1,1-tris-(4-hydroxyphenyl) ethane ; 1,3,5-tris-(2-hydroxyethyl) cyanuric acid; 4,6-dimethyl-2,4,6-tris-(4-hydroxyphenyl) heptane-2; 2,2-bis-4,4-(4,4"-dihydroxyphenyl)-cyclohexyl propane; 1,3,5-trihydroxybenzene; 1,2,3-trihydroxybenzene; 1,4-bis-(4',4"-dihydroxytriphenylmethyl)-benzene; 2',3',4'-trihydroxy acetophenone; 2,3,4-trihydroxybenzoioc acid; 2,3,4-trihydroxybenzophenone; 2,4,4'-trihydroxybenzophenone; 2',4',6'-trihydroxy-3(4-hydroxyphenyl) propiophenone; pentahydroxyflavone; 3,4,5-trihydroxypyrimidine; 3,4,5-trihydroxyphenylmethyl amine; tetrahydroxy-1,4-quinone hydrate;2,2',4,4' tetrahydroxybenzophenone; and 1,2,5,8 tetrahydoxyanthraquinone.

9. A process as claimed in claim 1, wherein the catalyst used is chosen from disodium salt of bisphenol-A, dipotassium salt of bisphenol-A, tetrabutylammonium hydroxide, tetramethylammonium hydroxide, tetrabutylammonium hydrogen bisbenzoate, tetrabutylammonium hydrogen bis-o-nitrobenzoate, tetrabutylammonium hydrogen bis-p-nitrobenzoate, [tetrabutylammoniumhydrogenbis-N,N-dimethylaminobenzoate; tetrabutylammonium hydrogen bis-N,N-dimethylaminobenzoate, tetrabutylammonium hydrogen bis-p-methoxybenzoate and tetramethylammonium hydrogen maleate.

10. A process as claimed in claim 1, wherein the quantity of catalyst used is from 10 to 150 ppm.

11. A process as claimed in claim 1, wherein solid state polycondensation is conducted by heating at a temperature in the range of 180°–220° C.

12. A process as claimed in claim 1, wherein the solid state polycondensation is conducted for a period of 2 to 10 hours.

13. A process as claimed in claim 1, wherein the solid state polycondensation is conducted in a fluidized bed using an inert gas as the fluidizing gas.

14. A process as claimed in claim 1, wherein the solid state polycondensation is conducted in presence of one of nitrogen, argon, carbon dioxide, and helium as fluidizing gas.

* * * * *

UNITED STATES PATENT AND TRADEMARK OFFICE
CERTIFICATE OF CORRECTION

PATENT NO. : 5,710,238

DATED : January 20, 1998

INVENTOR(S) : Swaminathan Sivaram et al.

It is certified that error appears in the above-identified patent and that said Letters Patent is hereby corrected as shown below:

Col. 5, line 62, cancel "0-5" and substitute --0.5--

Signed and Sealed this

Twenty-seventh Day of October, 1998

*Attest:*

BRUCE LEHMAN

*Attesting Officer*       *Commissioner of Patents and Trademarks*